(12) United States Patent
Dillig et al.

(10) Patent No.: US 8,873,207 B2
(45) Date of Patent: Oct. 28, 2014

(54) METHOD FOR OPERATING A GROUND FAULT INTERRUPTER AS WELL AS GROUND FAULT INTERRUPTER FOR A FREQUENCY CONVERTER

(75) Inventors: Reinhold Dillig, Memmelsdorf (DE); Bernd Herrmann, Herzogenaurach (DE); Hubert Schierling, Erlangen (DE); Benno Weis, Hemhofen (DE)

(73) Assignee: Siemens Aktiengesellschaft, München (DE)

( * ) Notice: Subject to any disclaimer, the term of this patent is extended or adjusted under 35 U.S.C. 154(b) by 88 days.

(21) Appl. No.: 13/605,618

(22) Filed: Sep. 6, 2012

(65) Prior Publication Data

US 2013/0170077 A1     Jul. 4, 2013

(30) Foreign Application Priority Data

Sep. 7, 2011    (EP) ..................................... 11180311

(51) Int. Cl.
| | | |
|---|---|---|
| *H02H 9/08* | (2006.01) | |
| *G01R 31/14* | (2006.01) | |
| *H02H 3/16* | (2006.01) | |
| *H02H 3/347* | (2006.01) | |
| *H01H 83/02* | (2006.01) | |
| *H02H 7/10* | (2006.01) | |

(52) U.S. Cl.
CPC ............... *H02H 3/162* (2013.01); *H02H 3/347* (2013.01); *H02H 7/10* (2013.01); *H01H 83/02* (2013.01)
USPC ............................................ 361/42; 324/510

(58) Field of Classification Search
USPC ........................................... 361/42; 324/510
See application file for complete search history.

(56) References Cited

U.S. PATENT DOCUMENTS

| | | | |
|---|---|---|---|
| 7,663,850 B2 * | 2/2010 | Leppanen ........................ 361/43 |
| 8,203,346 B2 * | 6/2012 | Tilhonen et al. ............... 324/509 |
| 2008/0084215 A1 * | 4/2008 | Itten et al. ....................... 324/510 |
| 2009/0080127 A1 | 3/2009 | Mirafzal | |
| 2009/0322083 A1 * | 12/2009 | Wagoner et al. ................. 290/44 |

FOREIGN PATENT DOCUMENTS

| | | |
|---|---|---|
| DE | 102 37 342 A1 | 3/2004 |
| DE | 10 2005 028 881 A1 | 1/2007 |
| DE | 10 2007 031 342 A1 | 1/2009 |
| EP | 1 512 207 B1 | 10/2005 |
| EP | 1 939 997 A2 | 7/2008 |
| WO | WO 2004-017483 A1 | 2/2004 |

* cited by examiner

*Primary Examiner* — Scott Bauer
(74) *Attorney, Agent, or Firm* — Henry M. Feiereisen LLC (57) ABSTRACT

A conventional ground fault interrupter in an arrangement with a frequency converter and electrical machines may be accidentally tripped due to operation-related leakage currents. This can be prevented by operating a ground fault interrupter for a frequency converter receiving a mains current in the following manner: receiving switching information about switching operations in the frequency converter, measuring a signal associated with a common mode current in a power line device which conducts the mains current to the frequency converter, determining, based on the switching information, an expected signal expected for the common mode current produced by the switching operations, identifying, based on the measured signal and the expected signal, a fault current, and interrupting the mains power depending on the identified fault current. A ground fault interrupter is hereby provided with an evaluation unit configured to carry out the method.

17 Claims, 5 Drawing Sheets

METHOD FOR OPERATING A GROUND FAULT INTERRUPTER AS WELL AS GROUND FAULT INTERRUPTER FOR A FREQUENCY CONVERTER

CROSS-REFERENCES TO RELATED APPLICATIONS

This application claims the priority of European Patent Application, Serial No. 11180311.0, filed Sep. 7, 2011, pursuant to 35 U.S.C. 119(a)-(d), the content of which is incorporated herein by reference in its entirety as if fully set forth herein.

BACKGROUND OF THE INVENTION

The present invention relates to a ground fault interrupter for a frequency converter. The present invention also relates to a method for operating a ground fault interrupter for a frequency converter The following discussion of related art is provided to assist the reader in understanding the advantages of the invention, and is not to be construed as an admission that this related art is prior art to this invention.

An electrical machine can, for example, be operated on an electrical power supply network by means of a frequency converter. For this purpose, AC voltages are generated by the frequency converter in windings of the machine, the frequency and effective value of which are predetermined by the frequency converter. In such cases the frequency converter first charges up a smoothing capacitor in a DC link circuit with mains power by means of a rectifier, which it receives via the mains lines of the ground fault interrupter. Thus a DC voltage is made available in the DC link circuit. An inverter of the frequency converter then creates from the DC voltage the individual AC voltages in the windings of the electrical machine. The frequency and the average amplitude of the AC voltages can be set here for example based on a pulse width modulation of switching signals for semiconductor power switches, with the aid of which the AC voltages are created in the inverter.

However, operational leakage currents, i.e. currents which do not flow in and out exclusively via the power lines of the ground fault interrupter, can occur because of pulse width modulation. Instead the circuit is closed via a ground or chassis potential. The leakage currents are made possible in this case by a capacitive coupling between the frequency converter or the electrical machine on the one hand and objects its environment on the other hand.

A leakage current represents a common mode current in the power lines. It thus corresponds in relation to the flux direction of the current to a residual current which likewise flows as a common mode current by ground or chassis potential if for example insulation of the windings in the motor is damaged and therefore a current flows away out of the frequency converter via a housing of the motor.

If an arrangement of frequency converter and electrical machine for protecting personnel and/or preventing a fire is thus operated via a conventional ground fault interrupter, the problem can arise of such a power switch not being able to distinguish between an actual residual current (caused by a damaged cable for example) and an operationally-generated leakage current. The result is therefore undesired faulty tripping of the ground fault interrupter.

It would therefore be desirable and advantageous to obviate prior art shortcomings and to provide an improved ground fault interrupter to be used for a frequency converter.

SUMMARY OF THE INVENTION

According to one aspect of the present invention, a method for operating a ground fault interrupter for a frequency converter receiving a mains current includes the steps of receiving switching information about switching operations in the frequency converter, measuring a signal associated with a common mode current in a power line device which conducts the mains current to the frequency converter, determining—based on the switching information—an expected signal expected for the common mode current produced by the switching operations, identifying—based on the measured signal and the expected signal—a fault current, and—depending on the identified fault current—interrupting the mains power.

According to another aspect of the present invention, a ground fault interrupter for a frequency converter includes a power line device configured to supply the frequency converter with an AC mains current from an electrical power supply network, a switching device configured to interrupt the AC mains current in the power line device in response to a trigger signal, a measurement device configured to detect a signal associated with a common-mode current in the power line device, and an evaluation unit coupling the measurement device to the switching device. The evaluation unit includes an additional signal input configured to receive information about switching operations in the frequency converter. The evaluation unit is furthermore configured to receive switching information about switching operations in the frequency converter, measure a signal associated with a common mode current in a power line device which conducts the mains current to the frequency converter, determine—based on the switching information—an expected signal expected for the common mode current produced by the switching operations, identify—based on the measured signal and the expected signal—a fault current, and—depending on the identified fault current—generate a trip signal for the switching device to interrupt the mains power.

The inventive method for operating a ground fault interrupter takes account of when precisely the power switch is switched into the frequency converter. This is based on the knowledge that a magnitude of the leakage current becomes especially large during such switching operations. The reason for this is that the transient voltage curves accompanying the switching of the power switch have a high-frequency signal component such that corresponding low impedances of the coupling capacitances are produced.

In accordance with the method, switching information about switching operations in the frequency converter is received by the ground fault interrupter. In addition a signal for a common mode current is detected in a power line device via which the frequency converter receives mains power. It is then determined based on the switching information which signal would be expected for the common mode current if that signal were produced as a result of the switching operations (not for example by an additional fault current). A fault current can then be recognized based on the detected (actual) signal for the common mode current and of the expected signal, and the mains current can be interrupted, if necessary.

With the inventive method, a reliable distinction can advantageously be made based on the switching information between an operational leakage current and an undesired fault current. The result is that the ground fault interrupter is tripped incorrectly less frequently. As a further advantage, a signal for the common mode current needs to be detected only at a single of the arrangement of ground fault interrupter and frequency converter, namely in the mains-side power line device. This advantageously reduces the circuit outlay for providing a ground fault interrupter which can be operated in accordance with the inventive method.

According to an advantageous feature of the present invention, the signal detected for the common mode current and hence also the signal determined as the expected signal involves in each case a temporal course of a magnitude of the common mode current. A time signal, which may be generated for example by a summation current transformer, can then advantageously be immediately processed. No additional computing steps, for example a frequency transformation, are needed. According to another advantageous feature of the present invention, an absolute value spectrum of such a time signal may be determined as a signal. The switching information can thereby be advantageously transmitted form from the source of the switching information through to the ground fault interrupter in an especially compact. According to another advantageous feature of the present invention, a combination of a temporal course and an absolute value spectrum may be used.

According to another advantageous feature of the present invention, a fault current based on the recorded signal and the expected signal may be detected by checking the recorded signal based on a criterion which is formed based on the expected signal. For example, time segments during which a fault current is detected may thus be determined based on the expected signal as well as time segments during which the detection is interrupted, because for example precisely a switching operation in the frequency converter is generating a leakage current with a critical magnitude. According to another advantageous feature of the present invention, at least one item of information about a switching time may be received as switching information relating to switching of a power switch of the frequency converter. At this point in time the detection of a fault current can then be interrupted and thus incorrect tripping avoided. In other words, switching edges which are produced in the signal for the common mode current as a result of the switching operations can be filtered out.

According to another advantageous feature of the present invention, an edge gradient and/or a ground capacitance may be received as switching information. A magnitude of a leakage current peak to be expected caused by the switching operation can then advantageously be determined and therefore a distinction between a leakage current and a fault current can be made even during the switching operation. The information about the edge gradient in this case enables the period of time to be defined here in which a specific power switch of the frequency converter reaches a state between a completely blocking state and a state in which a current with a predetermined effective nominal magnitude is flowing across the power switch. The capacitance to ground specifies a coupling capacitance between a component of the frequency converter or an electrical machine connected to the latter and a ground potential in the environment of the component.

According to another advantageous feature of the present invention, at least one item of information to be received as switching information contains information about whether an AC voltage line of an inverter of a frequency converter is connected electrically to a positive potential or a negative potential of a DC link circuit of the frequency converters. The flow direction of the expected leakage current can thus be deduced and a mathematical sign of corresponding values of the expected signal can be predicted.

The amount of data received as switching information can be advantageously reduced if the at least one item of information about a required voltage and a pulse frequency which is generated by an inverter of the frequency converter is received as switching information. In other words, in this embodiment a signal is not transmitted to the ground fault interrupter for each individual switching operation of a power switch of the frequency converter. The pulse pattern of the switching operations to be expected can be predicted from the switching voltage and the pulse frequency in a simple manner by calculating the individual switching times from the received switching information based on the switching algorithm used to operate the inverter. It may be sufficient to only transmit one of the two operating variables to the ground fault interrupter if this is adequate for calculating the pulse pattern.

According to another advantageous feature of the present invention, the transfer of data through to the power switch may be reduced even further by receiving a frequency spectrum of the expected signal for the common mode current. This exploits the fact that overall a linear spectrum arises from the switching operations, which may be transmitted by transmitting only specific support points (such as the amplitudes at the pulse frequency and their integer multiples as well as associated sidebands for these frequency points).

According to another advantageous feature of the present invention, computing power needed to perform the inventive method may be reduced when the received switching information includes information about at least one of the following operating variables of an inverter of the frequency converter being: motor frequency, level of activation, and pulse frequency. From these variables (or possibly already from a subset thereof, if for example the remaining variables are constant and are therefore known in advance) an expected absolute value spectrum as a common mode current signal can be readily calculated in the absence of an additional fault current. This expected absolute value spectrum can then be compared with a measured absolute value spectrum of the common mode current for detecting a fault current.

According to another advantageous feature of the present invention, in conjunction with detecting a fault current, a spectral envelope for, on the one hand, a detected frequency spectrum and, on the other hand, for an expected frequency spectrum may be formed. This spectral envelope allows an operationally-related leakage current to be distinguished especially clearly from an undesired fault current. The embodiment is based on the knowledge that for an operationally-related leakage current the envelope takes the form of a pulse-shaped comb, whereas with a fault current that is additionally present the envelope, takes the shape of a Si function ($\sin(x)/x$) in each case instead of the individual pulses.

According to another advantageous feature of the present invention, for detecting the fault current, the recorded signal may additionally be checked as to whether a least one of the following spectral components satisfies a predetermined criterion: a 50 Hz component, a 60 Hz component, a 300 Hz component, and/or a 360 Hz component. The criterion can in such cases be different for each of the signal components. For example, a check can be made as to whether the amplitude of the spectral component is greater than a specific threshold value. Depending on the type of electrical power supply network supplying the mains current to the frequency converter, a mains-side short to ground can be detected based on the 50 Hz component or the 60 Hz component, i.e. a short to ground between the power line device for the mains current and a surrounding ground potential. Likewise, a short to ground of the DC link circuit of the frequency converter may be detected based on the 300 Hz component or the 360 Hz component, i.e. a short to ground between an electrical conductor for the positive potential or the negative potential of the DC link circuit on the one hand and a surrounding ground potential of the DC link circuit.

According to another advantageous feature of the present invention, in relation to the source for the switching information, the switching information may be received from at least one inverter of the frequency converter and/or of a higher-level control unit controlling the at least one inverter. In this way, information computed within the inverter itself, e.g. by a control unit for a bridge circuit of the inverter, may advantageously also be provided by an inverter. Switching information about all inverters operated on the DC link circuit of the frequency converter may be received via a single communication line from a higher-level control unit. In addition, information about impending control processes may also be retrieved from the control unit. Such information is typically available for example within the framework of operation of devices in accordance with the Smart energy concept, for example the ProfiEnergy concept. The calculation of the expected signal may then be started earlier, allowing more comprehensive calculations to be performed.

The inventive ground fault interrupter is an improvement of the ground fault interrupter described at the onset. According to an advantageous feature of the present invention, the evaluation unit the inventive ground fault interrupter may have an additional signal input for receiving information about switching operations in the frequency converter. The evaluation unit may also be configured to carry out an embodiment of the inventive method. To interrupt the mains current when a fault current is detected, the evaluation unit is also designed to generate a tripping signal for switching the switching device.

According to another advantageous feature of the present invention, the signal input may include a connection for coupling the residual-current circuit to a digital communication bus. In this embodiment the ground fault interrupter may be coupled to a system bus via which control information is exchanged between the frequency converter and a higher-level control unit of the converter. System buses already present can thus advantageously be used for receiving the switching information.

According to another advantageous feature of the present invention, the measurement device for measuring the signal for the common mode current in the power line device may be a summation current transformer, especially a ring core with a coil or a compensation transformer. This results in an especially low-cost and simple-to-manufacture ground fault interrupter, which has the additional advantage that the evaluation unit is galvanically decoupled from the power line device for the mains current.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
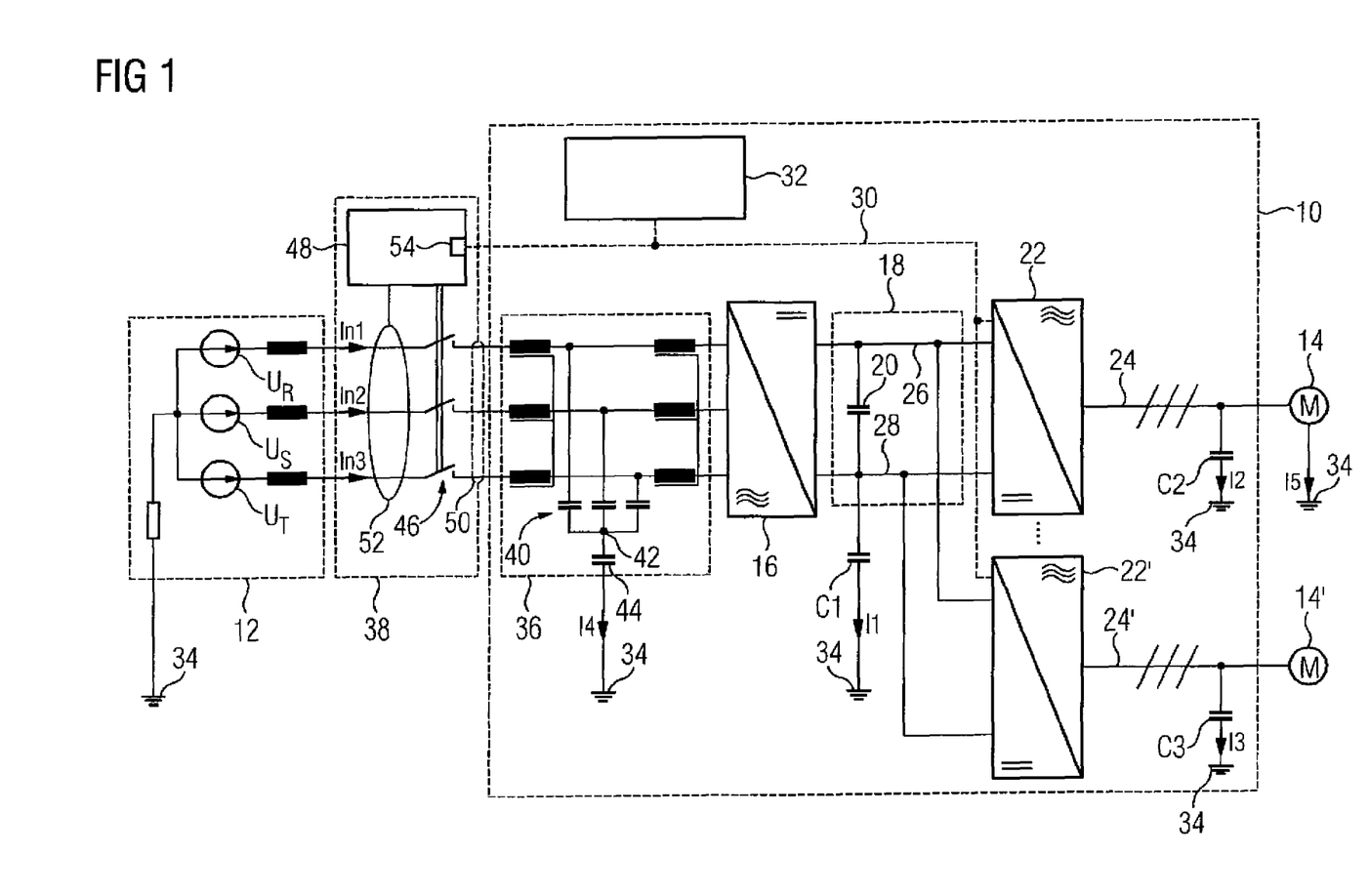
FIG. 1 shows a schematic diagram of an embodiment of the ground fault interrupter according to the present invention, with a frequency converter and ground fault interrupter connected upstream of the frequency converter.

Turning now to the drawing, and in particular to FIG. 1, there is shown a frequency converter 10 which is connected to a three-phase alternating current power supply network 12. In the exemplary embodiment mains voltages or star voltages Ur, Us, Ut of the power supply network 12 have an effective value of 230 V and an alternating frequency of 50 Hz. Electrical machines 14, 14' on the power supply network 12 are operated via the frequency converter 10. The frequency converter 10 can for example be designed to transmit an electrical power of more than 10 kW.

For the operation of the electrical machines 14, 14', a rectifier 16 of the frequency converter 10 generates a rectified DC link circuit voltage from the star voltages Ur, Us, Ut in a DC link circuit 18, which is smoothed by a smoothing capacitor 20. Inverters 22, 22' in respective three-phase motor lines 24, 24' generate from the DC link circuit voltage AC voltages with an alternating frequency and an effective value which are both set by means of the respective inverter 22, 22'.

To generate the alternating voltages in the motor lines 24, 24', the inverters 22, 22' each have three half bridges with semiconductor power switches (not shown in the diagram), via which individual phase conductors of the motor lines 24, 24' are alternately connected electrically to a plus potential bus bar 26 and minus potential busbar 28 of the DC link circuit 18. The individual power switches are controlled in this example for this purpose with a pulse-width-modulated control signal. The control signals are generated by activation units of the inverters 22, 22' (not shown in the diagram). The activation units generate the pulse signals as a function of switching information which they receive via a digital communication bus 30 from a higher-level control unit 32. The communication bus 30 can for example involve a system bus of type Drive CliQ of the Sinamics S120 system architecture, as is marketed by Siemens AG.

The busbars 26, 28 have a coupling capacitance C1 in relation to a ground potential 34 of an environment of the frequency converter 10. Accordingly, coupling capacitances C2, C3 are produced between the motor lines 24, 24' and the ground potential 34. The individual power switches of the inverters 22, 22' are switched in the example with a frequency of 4 kHz. This means that individual switching peaks are produced in the voltage curves of the phase conductors of the motor lines 24, 24' and also in the rectified voltage in the busbars 26. Through the high switching frequency the coupling capacitances C1 to C3 form a comparatively low impedance, and thus during the operation of the machines 14, 14' operational leakage currents I1, I2, I3 flow between the components of the frequency converter 10 and the ground potential 34.

An EMC filter 36 and a ground fault interrupter 38 are connected upstream of the rectifier 16 on the mains side, i.e., toward the power supply network 12.

The EMC filter 36 comprises a star circuit 40 of filter capacitors, of which the star point 42 is coupled via a grounding capacitor 44 capacitively to ground potential 34. An operational leakage current I4 flows away via the grounding capacitor 44 towards ground potential 34.

The ground fault interrupter 38 is an embodiment of the inventive protective switch. With the ground fault interrupter 38 mains currents In1, In2, In3 flowing from the power supply network 12 into the frequency converter 10 can be interrupted by a contactor 46. The contactor 46 is always opened by an evaluation unit 48 of the ground fault interrupter 38 if a magnitude of the common mode current which is determined as the sum current between three mains phase conductors 50 of the power supply network 12 exceeds a predetermined limit value. The mains phase conductors 50 form a power line device.

To measure the common mode current the ground fault interrupter 38 has a ring core 52. The three mains phase conductors 50 are routed together through the ring core 52. Located on the ring core 52 is an additional coil, via which a voltage signal is measured which is proportional to the sum current $Is = In1 + In2 + In3$. The signal of the coil is evaluated by the evaluation unit 48 as a signal for the common mode current Is. As an alternative to a voltage measurement at the coil itself measurement can also be undertaken in accordance with the compensation transformer principle. The sum current Is is also not equal to zero during fault-free operation of the frequency converter 10. The operational leakage currents I1 to I4 mean that a time curve of the sum current Is corresponds to the sum of the leakage current I1 to I4.

The evaluation unit 48 is connected via a bus connection 54 to the communication bus 30 and receives the switching information which is exchanged between the control unit 32 and the inverters 22, 22' via the communication bus 30.

For the explanations given below it is assumed that an electrical line is damaged in the electrical machine 14 and this produces a low-resistance short to ground between the electrical machine 14 and the ground potential 34, so that a fault current I5 flows between the electrical machine 14 and the ground potential 34.

Figure 2:
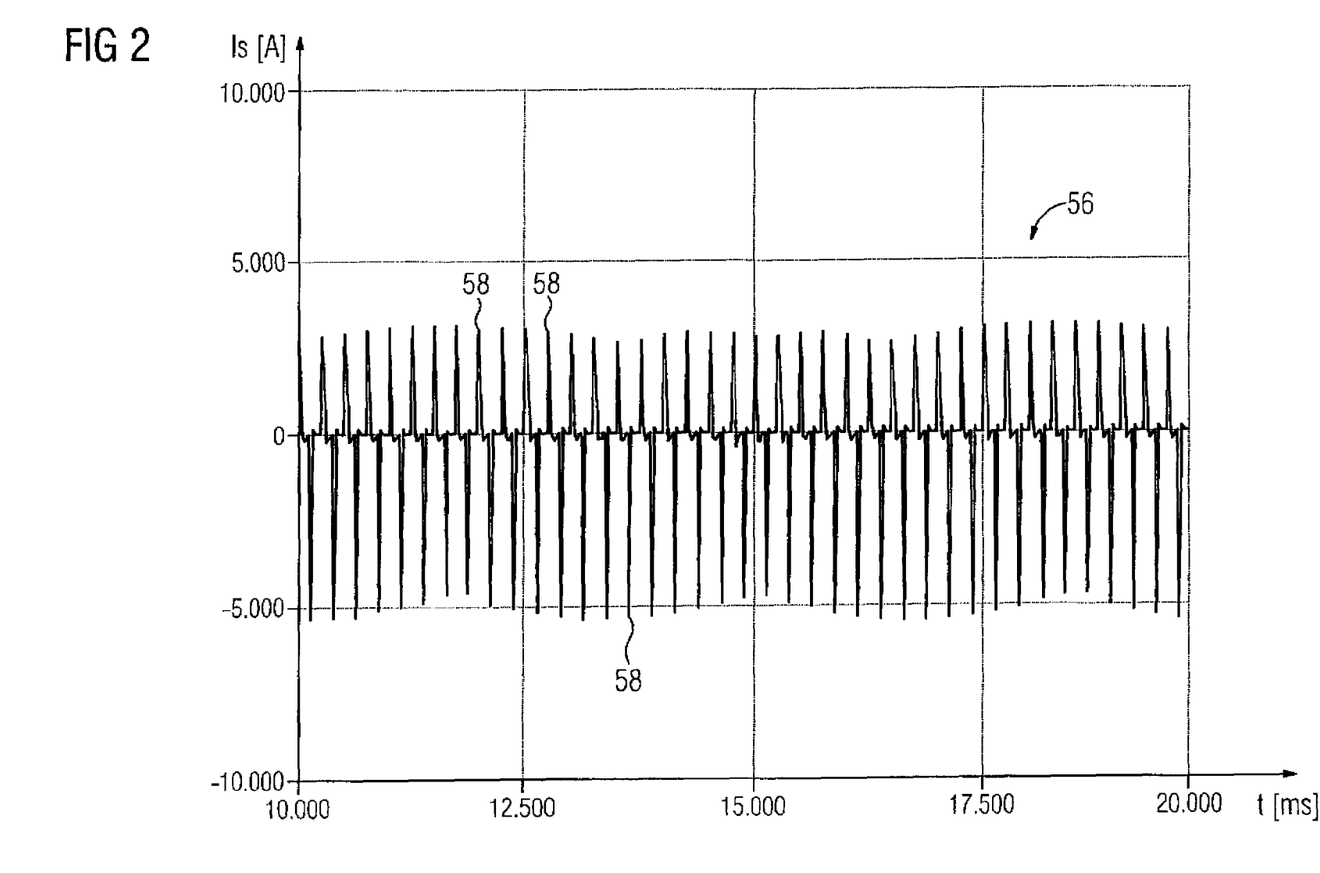
FIG. 2 shows a diagram with a temporal course of a magnitude of a common mode current, wherein the signal is derived from a summation current transformer of the ground fault interrupter of FIG. 1 in fault-free operation.
Figure 3:
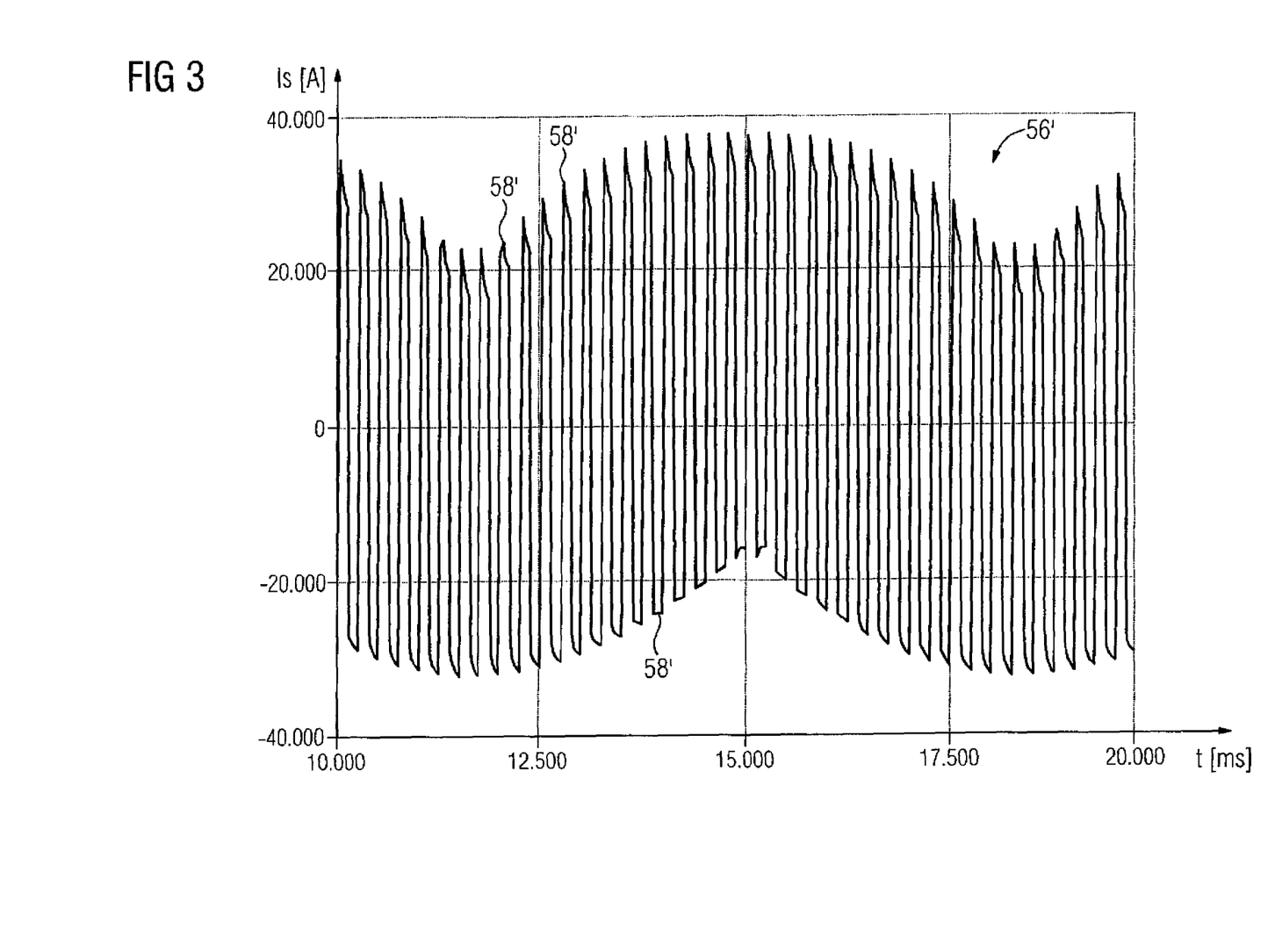
FIG. 3 shows a diagram with a temporal course of a magnitude of a common mode current measured during a low-resistance short to ground with the summation current transformer of the ground fault interrupter of FIG. 1.
Figure 4:
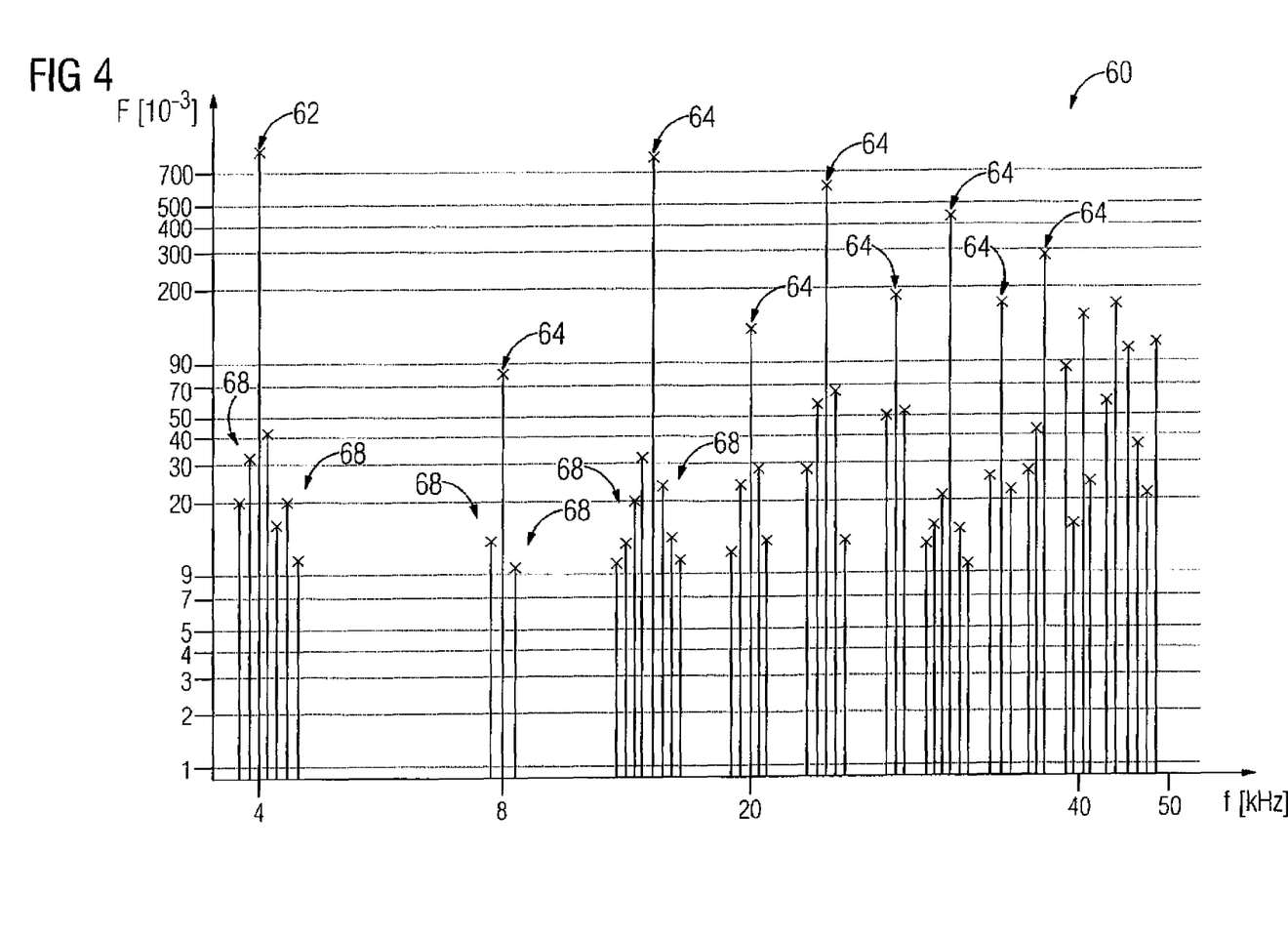
FIG. 4 shows a diagram with an absolute value spectrum for the temporal course of FIG. 2.
Figure 5:
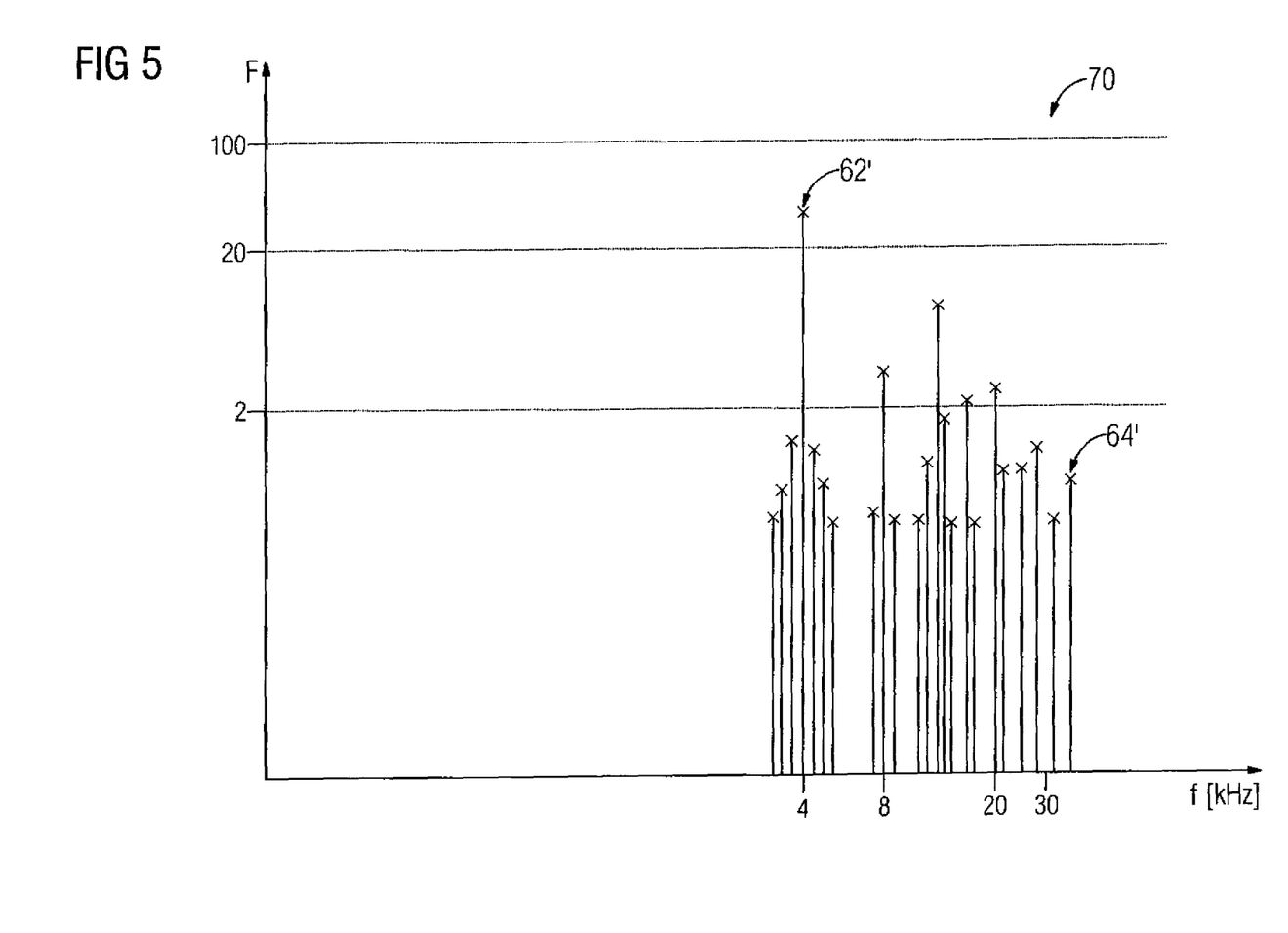
FIG. 5 shows a diagram with an absolute value spectrum for the temporal course of FIG. 3.

FIG. 2 shows a curve of the sum current Is (in Amperes A) over the time t (in ms), as is produced in fault-free operation $(Is = I1 + I2 + I3 + I4)$. FIG. 4 shows associated values F of the absolute value spectrum of the frequency f (in Hz). FIG. 3 on the other hand shows the time curve of the sum current Is during the low resistance short to ground $(Is = I1 + I2 + I3 + I4 + I5)$. The units in the diagram of FIG. 3 correspond to those of FIG. 2. FIG. 5 shows an absolute value spectrum for the diagram of FIG. 3. The units of the diagram of FIG. 5 correspond to those of the diagram of FIG. 4.

The ground fault interrupter 38 is able to distinguish the operational leakage currents I1 to I4 from the actual fault current I5. For this purpose the activation unit 48 receives the switching information for the inverters 22, 22' from the higher-level control unit 32 over the communication bus 30. The activation unit 48 has evaluation electronics which for example can be provided in the form of a digital signal processor or of a microcontroller.

The curve 56 of the sum current Is (see FIG. 2) to be expected, i.e. the signal of the coil of the ring core 52 to be expected, can be calculated by the evaluation electronics, as would have to be produced in fault-free operation $(Is = I1 + I2 + I3 + I4)$. The decisive information, which is needed in this example by the evaluation unit 48 to enable the times of the occurrence of the expected operational leakage currents I1 to I4 to be determined, is the switching times of the individual power switches. On occurrence of a voltage peak during a switching operation to be expected, these are initially accepted by the evaluation unit 48 as a leakage current peak of an operational leakage current I1 to I4 and there is a wait for an expected switching duration. For reasons of clarity only three of the expected leakage current peaks 58 are provided with a reference character in FIG. 2.

If, after the switching duration to be expected, a value of the magnitude of the sum current Is is still greater than a predetermined limit value, this is interpreted by the evaluation unit 48 as a malfunction. The evaluation unit 48 then generates a trip signal, through which the contactor 46 is opened. The corresponding curve 56' of the sum current Is is shown in FIG. 3, as is produced for the presence of the fault current I5 $(Is = I1 + I2 + I3 + I4 + I5)$. Individual switching peaks 58' exhibit a larger amplitude than leakage current peaks 58. In addition the switching peaks 58' decay far more slowly than the leakage current peaks 58. This means that they form a square-wave pulse in each case.

The switching operations in the inverters 22, 22' do not have to take place synchronized with one another. The filtering out over time of the detection process for the fault current I5 as a result of switching operations taking place shortly after one another in time can lead overall to a filtering-out time being produced with too many inverters connected to the DC link circuit 18, which does not make a sufficient protection function of the frequency converters 10 by the ground fault interrupter 38 possible. There can be provision here for the ground fault interrupter 38 to transmit a delay command via the communication bus 30 of the higher-level control unit 32, through which further control pulses are then displaced and thus a check on a short to ground in the system is made possible by the ground fault interrupter 38.

In addition to the filtering out of the individual switching edges, i.e. the leakage current peaks 58 or the transients of the switching peaks 58', there can also be provision for estimating the level of the leakage current peaks 58 to be expected. To this end the activation unit 48 also then receives via the communication bus 30, in addition to the switching points, information about the average edge steepness of the inverter 22, 22'. In addition information is stored in the evaluation unit 48 about the parasitic ground capacitance, i.e. the coupling capacitances C1 to C3. In addition the information can also be processed about whether a phase conductor of the motor lines 24, 24' will be switched by a switching operation to the bus bar 26 or the bus bar 28.

To keep the communication outlay on the communication bus 30 low, instead of the actual switching times, information about the required voltages of the individual inverters 22, 22' and their pulse frequency can be transferred. It is then possible to calculate a pulse pattern in the evaluation unit 48, with which a plausibility check of the measured leakage current peaks 58 is possible.

In order to further reduce the necessary data transfer between the control unit 32 and the evaluation unit 48, the information can be transmitted as an absolute frequency value spectrum 60. Use can be made here of the fact that the absolute frequency value spectrum 60 of the signal of the coil of the ring core 52 is a linear spectrum in fault-free operation, i.e. it is sufficient to transmit specific checkpoints such as the amplitude 62 at the pulse frequency (4 kHz) and those amplitudes 64 at the whole number multiples as well as the amplitudes of the side plans 68 at these points. In FIG. 4, for the sake of clarity only a few of the amplitude 64 and the side band 68 are provided with reference characters by way of example.

The absolute value spectrum 60 can be formed from the required voltages which are provided by the control unit 32, by the evaluation unit 48 itself, but also already by the control unit 32. This can be compared with the measured absolute value spectrum 70 of the sum current Is in order to identify deviations. To this end envelopes of the absolute value spectra 60, 70 can also be included. In the event of the sum current Is only consisting of operational leakage currents (see FIG. 2), the current peaks 58 able to be detected in the curve 56 can be described as a pulse comb. The Fourier transform of this is once again a pulse comb. A short to ground fault on output line, i.e. one of the motor lines 24, 24', will by contrast always lead to a block-shaped current with the pulse frequency as signal frequency (see FIG. 3). The Fourier transform of this is a function which decays with sine(x)/x. Accordingly an amplitude 62' in the absolute value spectrum 70 at 4 kHz amounts to a value of over thirty and an amplitude 64' at a frequency of approximately 40 kHz only to an amplitude of 0.7 (700 m, with m standing for milli). This corresponds to a ratio of the amplitudes of approximately 57. In the absolute value spectrum 60 on the other hand, for the amplitude 62 at 4 kHz a value of one is produced and at approximately 40 kHz a value of appr. 0.1 (100 m). The amplitude ratio thus amounts to only 10.

Whether a sum current Is exclusively comprises operational leakage currents or also a fault current can thereby be recognized based on the envelopes of the absolute value spectra with the pulse frequency and its whole-number multiples. If this envelope is a pulse comb that decays only slowly, this is the normal operating state. If the envelope decays with sin(x)/x, this involves a fault current through a short to ground at a motor line 24, 24'.

With the ground fault interrupter 38 a short to ground is recognized in the DC link circuit 18 or on the mains side of the rectifier 16 by monitoring an amount of the frequency components of the sum current Is at 300 Hz/360 Hz (recognition for the DC link circuit) or at 50 Hz/60 Hz (recognition for the mains side).

Overall the example shows how it can be made possible for a ground fault interrupter to distinguish between a short to ground fault on motor output lines for pulse rectifiers and their operational leakage current. This distinction is based either on the time at which a specific current flows which can be assigned to a switching action in the pulse inverters, or on the absolute value spectrum which is produced by this. Thus high-resistance shorts to ground can also be recognized without any problem. The ground fault interrupter receives the necessary information via a system bus, the actual task of which is to transmit the information of a control and regulation unit to the drive modules (i.e. the inverters).

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for operating a residual current circuit breaker for a frequency converter receiving a mains current, comprising the steps of:
   receiving switching information about switching operations in the frequency converter;
   measuring a signal associated with a common mode current in a power line device which conducts the mains current to the frequency converter;
   determining, based on the switching information, an expected signal for the common mode current that would be produced by the switching operations in fault-free operation with operational leakage currents, but without presence of an actual fault current;
   identifying, based on the measured signal and the expected signal, a fault current, and
   depending on the identified fault current, interrupting with the residual current circuit breaker the mains power.

2. The method of claim 1, wherein that the measured signal and the expected signal each: comprise a temporal curve of a magnitude of the common mode current and/or a magnitude spectrum of the temporal curve.

3. The method of claim 1, wherein for identifying the fault current, it is checked whether the measured signal satisfies a criterion that depends on the expected signal.

4. The method of claim 1, wherein the received switching information includes at least information about a switching time at which a power switch of the frequency converter is switched.

5. The method of claim 1, wherein the received switching information includes at least information about at least one of an edge gradient and a capacity to ground.

6. The method of claim 1, wherein the received switching information includes at least information about whether in a switching operation an AC voltage line of an inverter of the frequency converter is electrically connected to a positive potential or to a negative potential of a DC link circuit of the frequency converter.

7. The method of claim 1, wherein the received switching information includes at least information about at least one of a desired voltage and a pulse frequency generated by an inverter of the frequency converter.

8. The method of claim 1, wherein the switching information is received as a frequency spectrum of the signal associated with the common mode current.

9. The method of claim 1, wherein the received switching information includes information about at least one operational variable of an inverter of the frequency converter selected from motor frequency, modulation depth, and pulse frequency.

10. The method of claim 1, wherein the fault current is identified by forming a spectral envelope for a detected frequency spectrum and a spectral envelope for an expected frequency spectrum.

11. The method of claim 1, wherein the fault current is identified by checking the measured signal as to whether a signal component having a spectral component selected from a frequency of 50 Hz, 60 Hz, 300 Hz, and 360 Hz satisfies a respective predetermined criterion associated with this spectral component.

12. The method of claim 1, wherein the switching information is received from at least one inverter of the frequency converter or from a higher-level control unit controlling the at least one inverter.

13. A residual current circuit breaker for a frequency converter, comprising:
- a power line device configured to supply the frequency converter with an AC mains current from an electrical power supply network,
- a switching device configured to interrupt the AC mains current in the power line device in response to a trigger signal,
- a measurement device configured to detect a signal associated with a common-mode current in the power line device, and
- an evaluation unit coupling the measurement device to the switching device, said evaluation unit comprising an additional signal input configured to receive information about switching operations in the frequency converter, wherein the evaluation unit is configured to
- receive switching information about switching operations in the frequency converter;
- measure a signal associated with a common mode current in a power line device which conducts the mains current to the frequency converter;
- determine, based on the switching information, an expected signal for the common mode current that would be produced by the switching operations in fault-free operation with operational leakage currents, but without presence of an actual fault current;
- identify, based on the measured signal and the expected signal, a fault current, and,
- depending on the identified fault current, generate a trip signal for the switching device to interrupt the mains power.

14. The residual current circuit breaker of claim 13, wherein the additional signal input comprises a connection for coupling the ground fault interrupter to a digital communication bus.

15. The residual current circuit breaker of claim 13, wherein the measurement device comprises a summation current transformer.

16. The residual current circuit breaker of claim 15, wherein the summation current transformer comprises a ring core.

17. The residual current circuit breaker of claim 15, wherein the summation current transformer comprises a compensation transformer.

* * * * *